US012452616B2

(12) United States Patent
Liao et al.

(10) Patent No.: US 12,452,616 B2
(45) **Date of Patent: *Oct. 21, 2025**

(54) SYSTEMS FOR BONE CONDUCTION SPEAKER

(71) Applicant: SHENZHEN SHOKZ CO., LTD., Guangdong (CN)

(72) Inventors: Fengyun Liao, Shenzhen (CN); Jinbo Zheng, Shenzhen (CN); Qian Chen, Shenzhen (CN); Hao Chen, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/026,717

(22) Filed: Jan. 17, 2025

(65) Prior Publication Data

US 2025/0159420 A1 May 15, 2025

Related U.S. Application Data

(63) Continuation of application No. 18/737,940, filed on Jun. 7, 2024, which is a continuation of application No. 17/658,824, filed on Apr. 12, 2022, now Pat. No. 12,156,000, which is a continuation of application No. 17/169,583, filed on Feb. 8, 2021, now Pat. No.

(Continued)

(51) Int. Cl.
*H04R 25/00* (2006.01)
*H04R 9/06* (2006.01)

(52) U.S. Cl.
CPC ............. *H04R 25/606* (2013.01); *H04R 9/06* (2013.01); *H04R 9/066* (2013.01); *H04R 2460/13* (2013.01)

(58) Field of Classification Search
CPC ......... H04M 1/03; H04R 1/025; H04R 1/028; H04R 1/10; H04R 1/1075; H04R 1/1091; H04R 1/24; H04R 1/345; H04R 9/02; H04R 9/06; H04R 9/063; H04R 9/066; H04R 29/001; H04R 2460/13; H04R 1/083; H04R 1/1041; H04R 1/1058; H04R 1/46; H04R 5/033; H04R 5/0335; H04R 25/00; H04R 25/453; H04R 25/48; H04R 25/60; H04R 25/606; H04R 25/65; H04R 25/70; H04R 31/00; A47C 7/727; G01H 11/06; H04B 1/385
See application file for complete search history.

(56) References Cited

U.S. PATENT DOCUMENTS 5,282,251 A * 1/1994 Petersen ................ A47C 7/727 381/301
5,323,468 A * 6/1994 Bottesch ................ H04R 5/033 381/151

(Continued)

OTHER PUBLICATIONS

The Extended European Search Report in European Application No. 24223173.6 mailed on Apr. 30, 2025, 10 pages.

*Primary Examiner* — Gerald Gauthier
(74) *Attorney, Agent, or Firm* — METIS IP LLC

(57) ABSTRACT

Methods and apparatus are described herein related to improving the sound quality of a bone conduction speaker. The sound quality of the bone conduction speaker is adjusted in the sound generation, sound transferring, and sound receiving of the bone conduction speaker by designing vibration generation manners and vibration transfer structures.

20 Claims, 13 Drawing Sheets

Related U.S. Application Data

11,343,625, which is a continuation of application No. 16/833,839, filed on Mar. 30, 2020, now Pat. No. 11,399,245, which is a continuation of application No. 15/752,452, filed as application No. PCT/CN2015/086907 on Aug. 13, 2015, now Pat. No. 10,609,496.

(56) References Cited

U.S. PATENT DOCUMENTS 6,377,697 B1 * 4/2002 Cheng .................... H04R 1/083 381/381
7,400,738 B2 * 7/2008 Niederdrank ........ H04R 25/453 381/317
8,553,910 B1 * 10/2013 Dong ..................... H04R 1/028 351/158
10,609,496 B2 * 3/2020 Liao ..................... H04R 25/606
11,343,625 B2 * 5/2022 Liao ..................... H04R 5/0335
11,463,814 B2 * 10/2022 Qi ............................ H04R 1/00
11,601,761 B2 * 3/2023 Qi ........................ H04R 1/1025
12,156,000 B2 * 11/2024 Liao ....................... H04R 9/066
2003/0012395 A1 * 1/2003 Fukuda .................. H04R 9/066 381/151
2005/0129257 A1 * 6/2005 Tamura .................. H04R 17/00 381/151
2006/0018488 A1 * 1/2006 Viala .................... H04R 1/1091 381/74
2006/0140435 A1 * 6/2006 Sheehy ................ H04R 1/1041 381/381
2006/0165246 A1 * 7/2006 Lee ........................ H04B 1/385 381/151
2006/0286998 A1 * 12/2006 Fukuda ................... H04M 1/03 455/550.1
2007/0053542 A1 * 3/2007 Lee ........................ H04R 11/02 381/380
2008/0107300 A1 5/2008 Chen
2009/0103768 A1 * 4/2009 Lin ...................... H04R 1/1058 381/390
2009/0245553 A1 * 10/2009 Parker .................... H04R 25/70 381/326
2010/0316235 A1 * 12/2010 Park ....................... H04R 1/025 381/151
2010/0329485 A1 * 12/2010 Fukuda .................. H04R 25/00 381/151
2013/0039520 A1 * 2/2013 Margolis .............. H04R 29/001 381/326
2013/0163791 A1 * 6/2013 Qi ............................ H04R 9/02 381/151
2014/0064533 A1 * 3/2014 Kasic, II ................ H04R 25/60 381/329
2014/0185822 A1 * 7/2014 Kunimoto ................ H04R 1/24 381/74
2014/0185837 A1 * 7/2014 Kunimoto ............ H04R 1/1075 381/151
2014/0274229 A1 * 9/2014 Fukuda ................... H04M 1/03 455/575.1
2015/0195664 A1 * 7/2015 Lin ........................ G01H 11/06 702/85
2015/0230034 A1 * 8/2015 Kaplan .................. H04R 25/48 600/25
2015/0256911 A1 * 9/2015 Lucas .................... H04R 11/02 381/390
2015/0264473 A1 * 9/2015 Fukuda .................... H04R 1/46 381/151
2015/0319526 A1 * 11/2015 Kunimoto ................ H04R 1/10 381/74
2017/0164088 A1 * 6/2017 Fukuda .................. H04R 1/345
2019/0014425 A1 * 1/2019 Liao ..................... H04R 5/0335
2020/0228904 A1 * 7/2020 Liao ....................... H04R 1/105
2021/0250694 A1 * 8/2021 Qi ............................ H04R 9/02
2021/0250700 A1 * 8/2021 Qi .......................... H04R 9/063
2021/0258696 A1 * 8/2021 Qi .......................... H04R 31/00

* cited by examiner

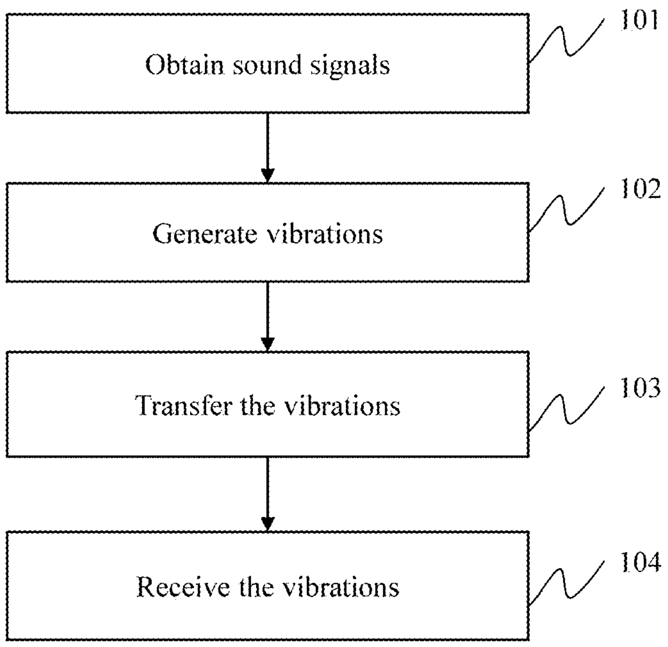
FIG. 1
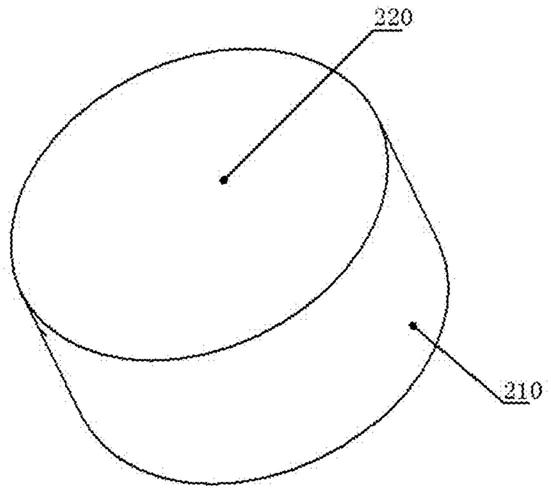
FIG. 2-A

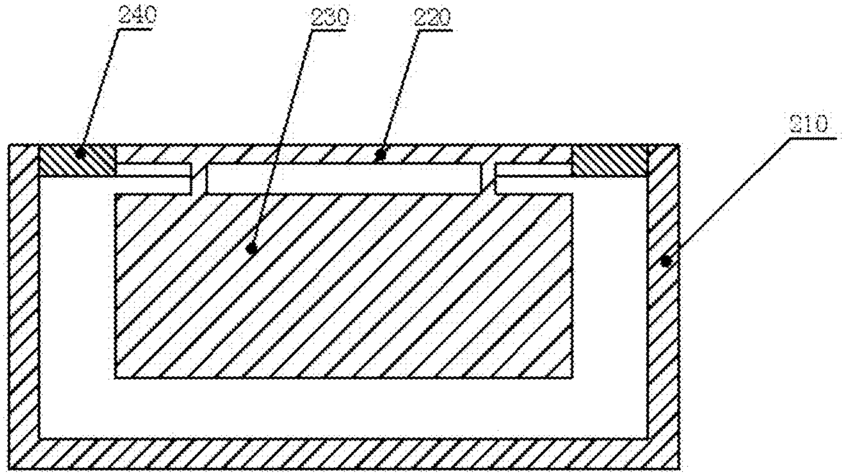
FIG. 2-B
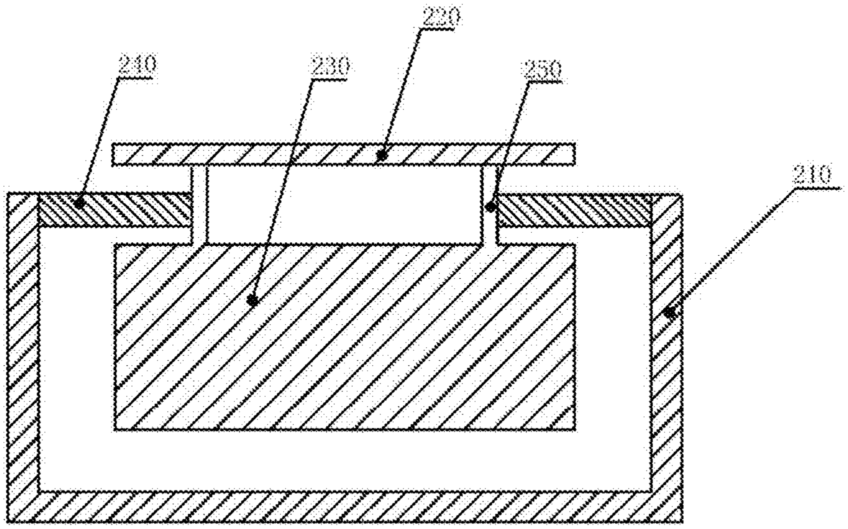
FIG. 2-C

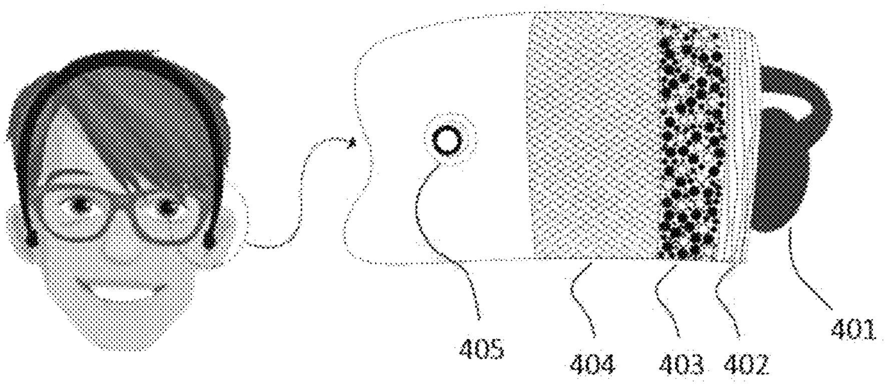
FIG. 3
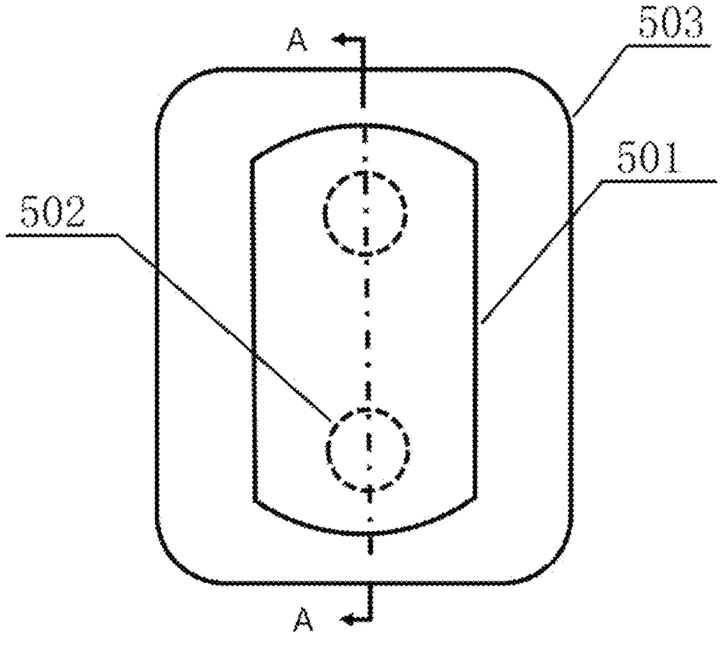
FIG. 4-A

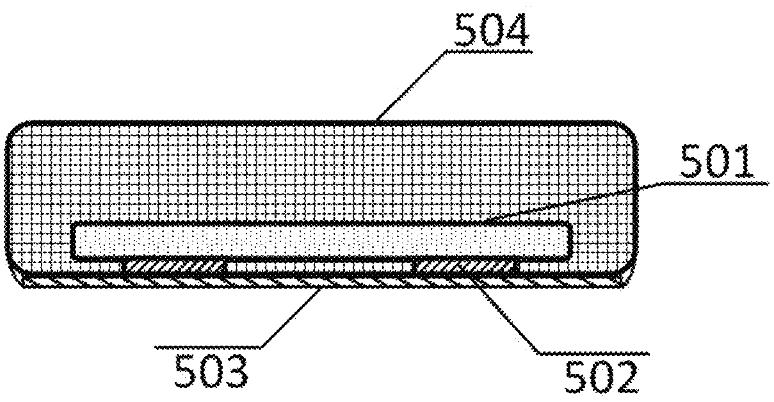
FIG. 4-B
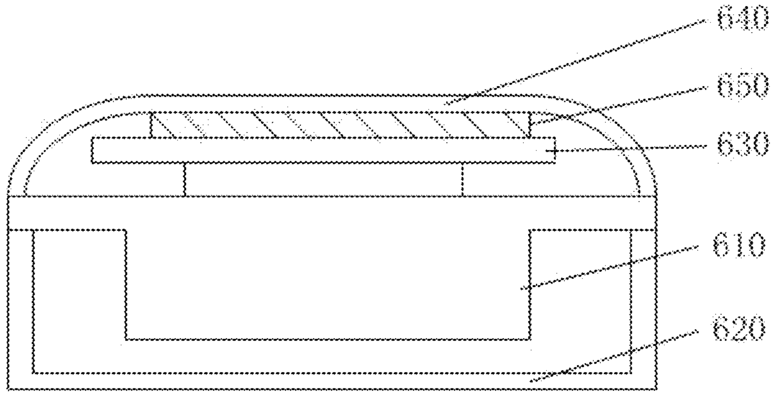
FIG. 5

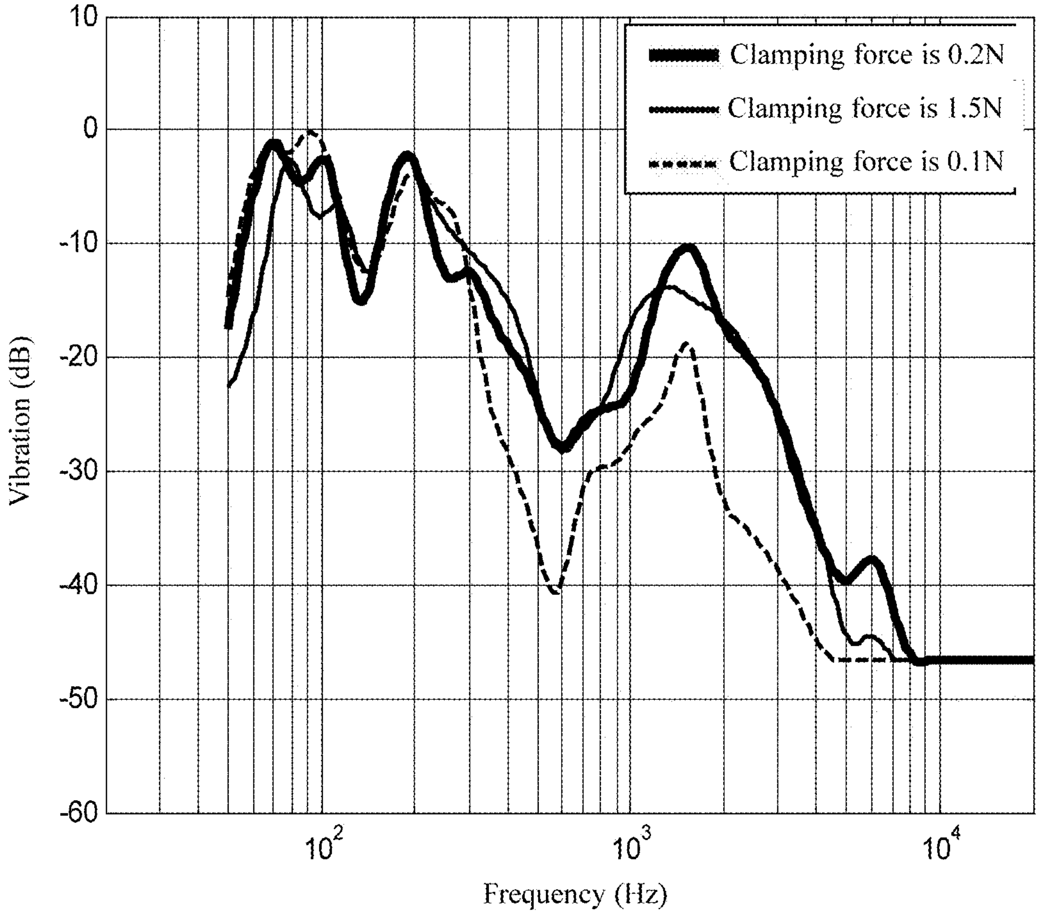
FIG. 7-A

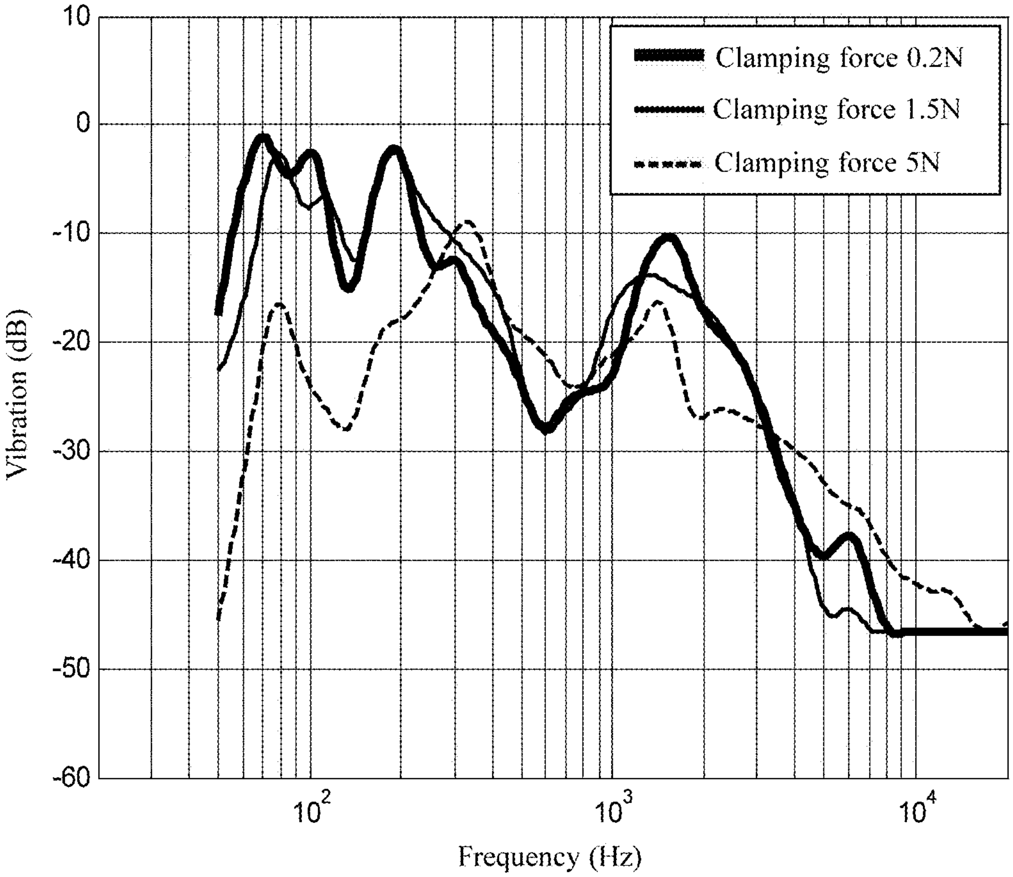
FIG. 7-B

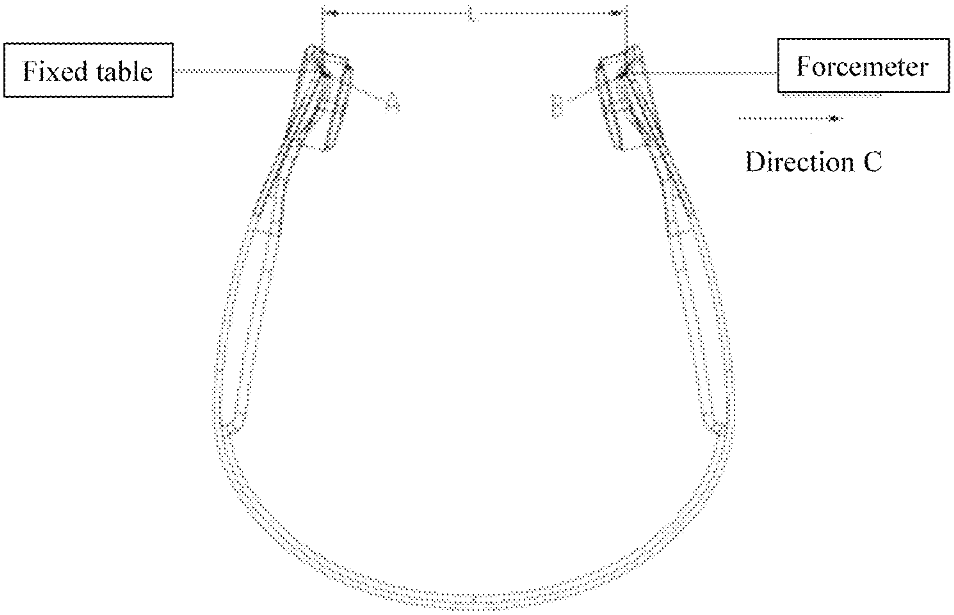
FIG. 8-A
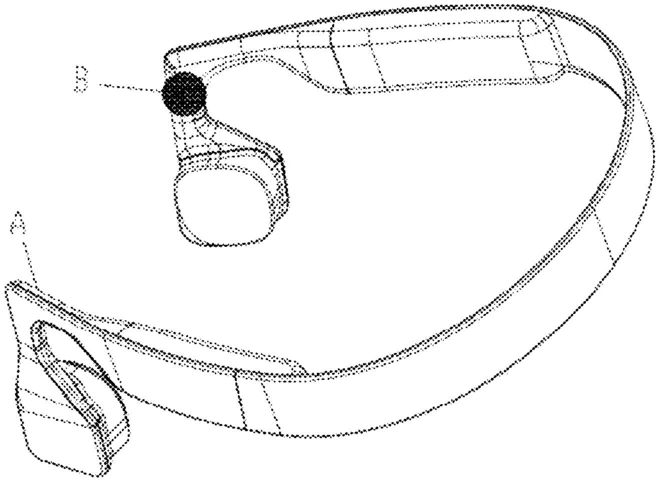
FIG. 8-B

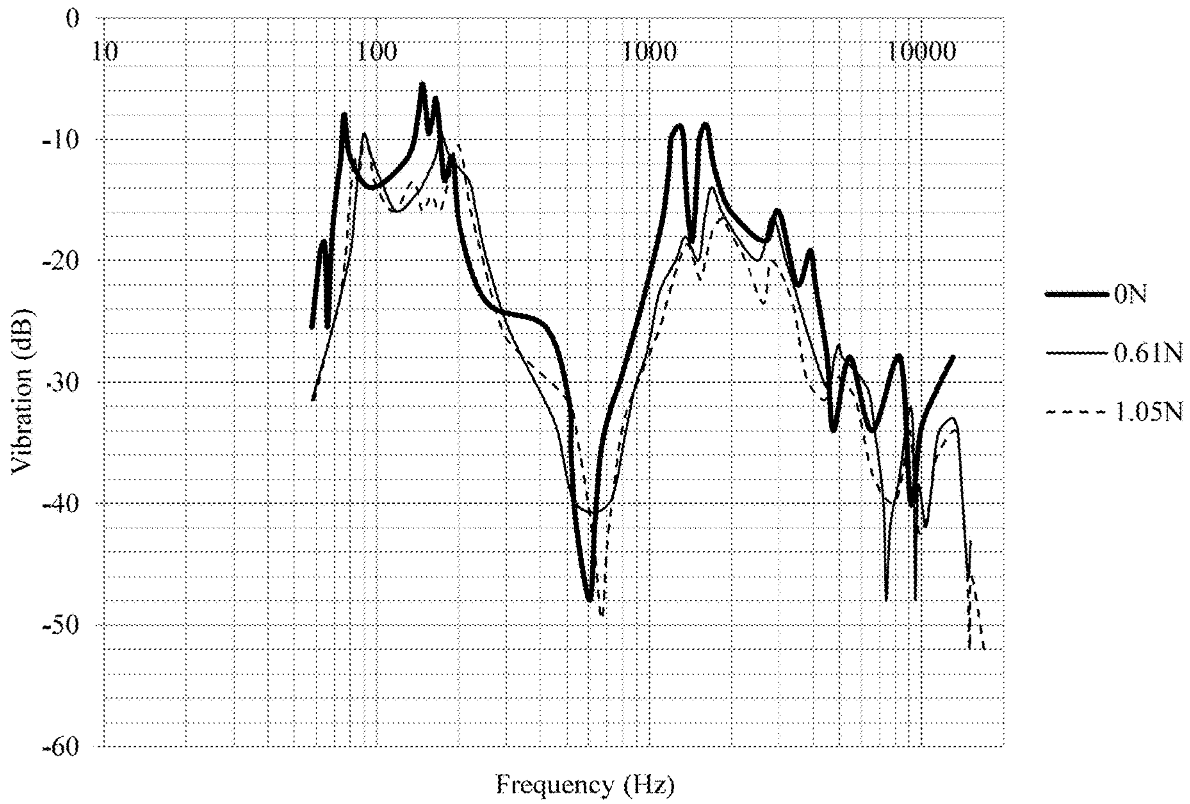
FIG. 8-C

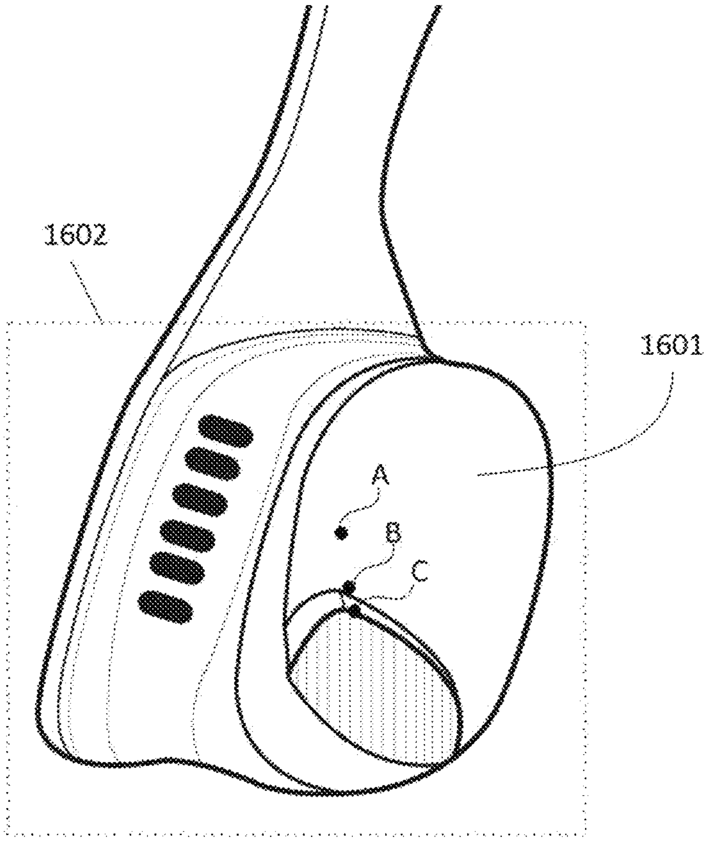
FIG. 10-A

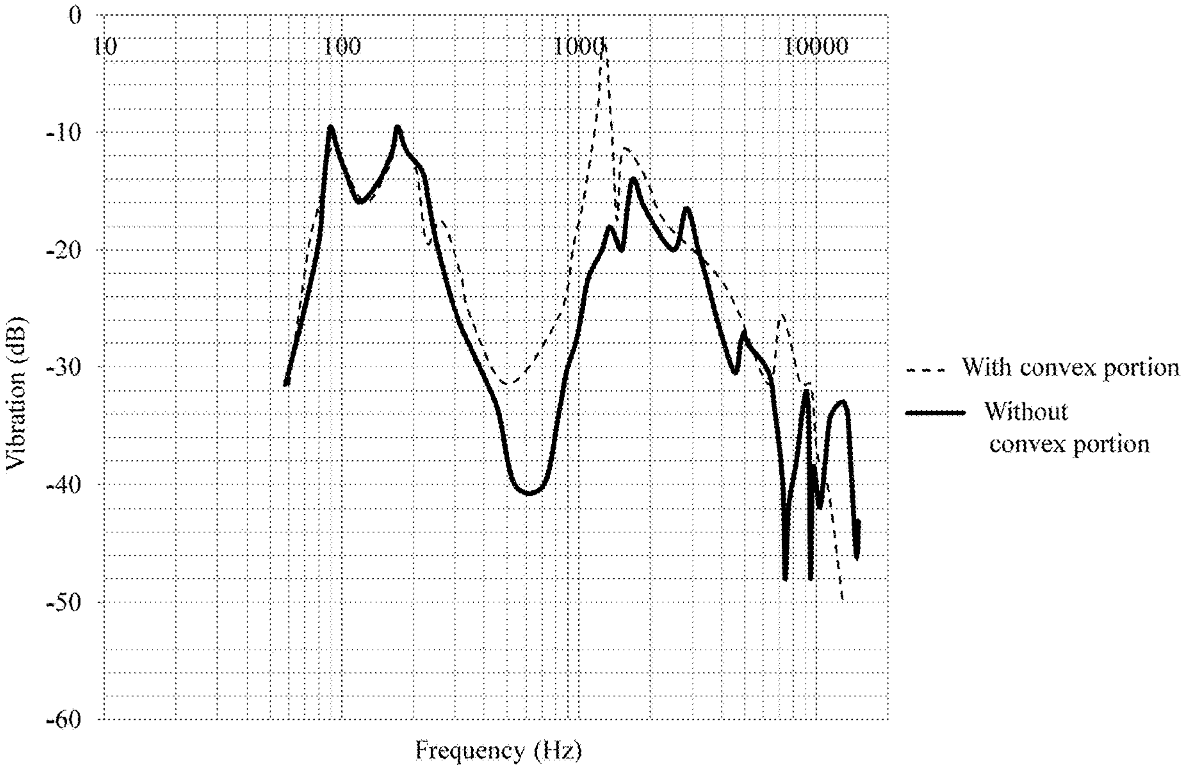
FIG. 10-B

SYSTEMS FOR BONE CONDUCTION SPEAKER

CROSS-REFERENCE TO RELATED APPLICATIONS

The present application is a continuation of U.S. application Ser. No. 18/737,940, filed on Jun. 7, 2024, which is a continuation of U.S. application Ser. No. 17/658,824 (issued as U.S. Pat. No. 12,156,000), filed on Apr. 12, 2022, which is a continuation of U.S. application Ser. No. 17/169,583 (issued as U.S. Pat. No. 11,343,625), filed on Feb. 8, 2021, which is a continuation of U.S. application Ser. No. 16/833,839 (issued as U.S. Pat. No. 11,399,245), filed on Mar. 30, 2020, which is a continuation of U.S. application Ser. No. 15/752,452 (issued as U.S. Pat. No. 10,609,496), filed on Feb. 13, 2018, which is a national stage entry under 35 U.S.C. § 371 of International Application No. PCT/CN2015/086907, filed on Aug. 13, 2015, the entire contents of which are hereby incorporated by reference.

TECHNICAL FIELD

The present disclosure generally relates to a bone conduction speaker, specific designs of the bone conduction speaker for improving the sound quality, particularly the sound quality of heavy bass, and relates to the reduction of sound leakage, and methods for enhancing the wearing comfort of the bone conduction speaker.

BACKGROUND

In general, one can hear sound because vibrations may transfer from external auditory canal to eardrum by air. Then the vibrations on the eardrum may drive auditory nerves to enable a person to get a perception of the vibrations of sound. A bone conduction speaker may transfer vibrations via the person's skin, subcutaneous tissue and bones to auditory nerves, thereby enabling the person to hear the sound.

SUMMARY

The present disclosure relates to a bone conduction speaker with high performances and methods for improving the sound quality of the bone conduction speaker through specific designs. The bone conduction speaker may include a vibration unit, and a headset bracket connected to the vibration unit. The vibration unit may include at least one contact surface. The contact surface may be at least partially in contact with the user directly or indirectly. The headset bracket providing a force between the contact surface and the user, the force between the contact surface and the user being larger than 0.3 N and smaller than 1.5 N.

BRIEF DESCRIPTION OF THE DRAWINGS

FIG. 1 illustrates a process for the bone conduction speaker making a user's ears generate auditory sense.

FIG. 2-A illustrates an exemplary configuration of the vibration generation portion of the bone conduction speaker according to some embodiments of the present disclosure.

FIG. 2-B illustrates an exemplary structure of the vibration generation portion of the bone conduction speaker according to some embodiments of the present disclosure.

FIG. 2-C illustrates an exemplary structure of the vibration generation portion of the bone conduction speaker according to some embodiments of the present disclosure.

FIG. 3 illustrates an exemplary diagram illustrating a sound vibration transmission system of the bone conduction speaker according to some embodiments of the present disclosure.

FIG. 4-A and FIG. 4-B illustrate a top view and a side view of the bonds of the bone conduction speaker panel according to some embodiments of the present disclosure, respectively.

FIG. 5 illustrates a structure of the vibration generation portion of the bone conduction speaker according to some embodiments of the present disclosure.

FIG. 7-A and FIG. 7-B illustrate vibration response curves of the bone conduction speaker according to some embodiments of the present disclosure.

FIG. 8-A and FIG. 8-B illustrate a process for measuring the clamping force of the bone conduction speaker according to some embodiments of the present disclosure.

FIG. 8-C illustrates a vibration response curve of the bone conduction speaker according to some embodiments of the present disclosure.

FIG. 10-A illustrates a structure of the contact surface of the vibration unit of the bone conduction speaker according to some embodiments of the present disclosure.

FIG. 10-B illustrates a vibration response curve of the bone conduction speaker according to some embodiments of the present disclosure.

DETAILED DESCRIPTION

Figure 6:
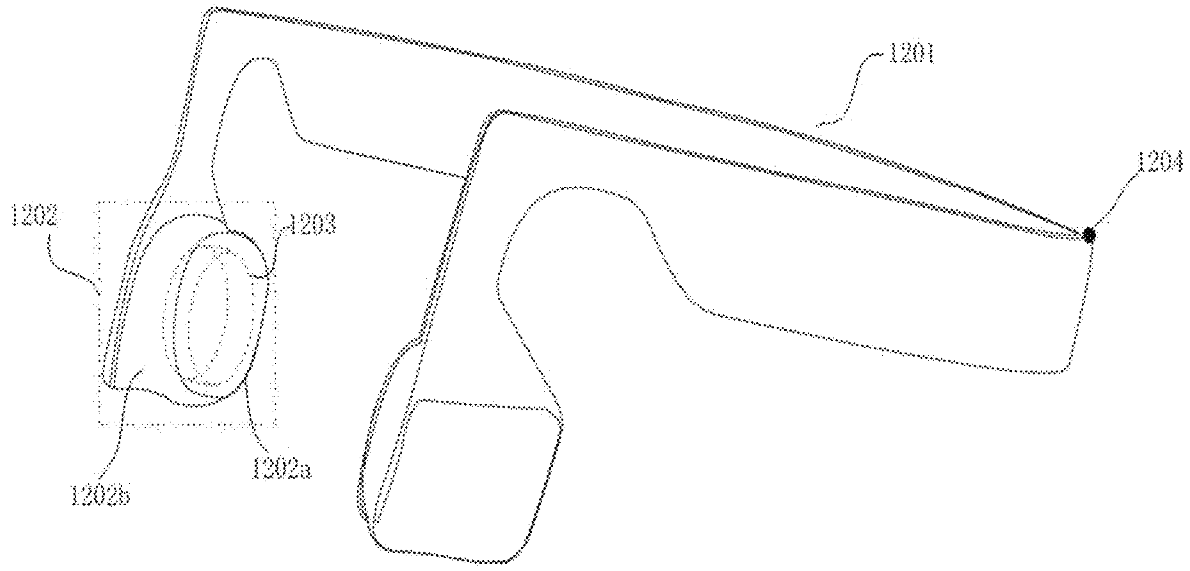
FIG. 6 illustrates a structure of the bone conduction speaker according to some embodiments of the present disclosure.

In order to illustrate the technical solution of some embodiments more clearly according to the present disclosure, the figures described in embodiments are briefly explained. Apparently, the following description of the drawings are only some embodiments of the present disclosure, and may not limit the scope of the present disclosure. Ordinary skilled in the art, without creative efforts, may apply these drawings in other similar applications based on the present disclosure.

As used in the specification and in the claims, the singular form of "a," "an," and "the" include plural referents unless the context clearly dictates otherwise. In general, the term "comprising" and "include" only includes the operations and elements which have been clearly identified, and these operations and elements cannot constitute elements of an exclusive list, method or apparatus may also contain other operations or elements. The term "based on" means "based at least partially on." The term "an embodiment" means "at least one embodiment"; the term "another embodiment" means "at least one further embodiment." Definitions of other terms are given in the descriptions below.

The bone conduction speaker may transfer sound to an auditory system of a person through his/her bone, and an auditory sense may be generated. FIG. 1 illustrates a process for the bone conduction speaker to generate an auditory sense. The process may include the following operations. In operation 101, the bone conduction speaker may obtain sound signals containing audio information. In operation 102, the bone conduction speaker may generate vibrations according to the signals. In operation 103, the vibrations may be transmitted to a sensor terminal by a transfer component. In operation 104, the sensor terminal may receive the vibrations to further perceive the audio information. In some embodiments, the bone conduction speaker may pick up or generate signals containing audio information, and convert the audio information into sound vibrations by a transducer. Then the sound may be transmitted to the sensory organs of a user, and the sound may be heard. In general, the auditory system, sense organs, etc., set forth above may be a part of a human being or an animal. It should be noted that the descriptions of the bone conduction speaker below may not be limited to a human being, but may be applied to other animals.

The term "sound quality" may indicate the quality of sound, which refers to an audio fidelity after post-processing, transmission, or the like. In an audio device, the sound quality may include audio intensity and magnitude, audio frequency, audio overtone, or harmonic components, or the like. When the sound quality is evaluated, measuring methods and the evaluation criteria for objectively evaluating the sound quality may be used, other methods that combine different elements of sound and subjective feelings for evaluating various properties of the sound quality may also be used, thus the sound quality may be affected during the processes of generating the sound, transmitting the sound, and receiving the sound.

There may be various processes for implementing the vibrations of the bone conduction speaker. FIG. 2-A and FIG. 2-B illustrate an exemplary structure of a vibration generation portion of the bone conduction speaker according to a specific embodiment of the present disclosure. The vibration generation portion of the bone conduction speaker may include a housing 210, a panel 220, a transducer 230, and a connector 240.

The panel 220 may transmit vibrations through tissue and bones to auditory nerves, which may enable a human being to hear sounds. The panel 220 may be in contact with human skin directly, or through a vibration transfer layer made of specific materials (which will be described in detail below). The specific materials may be selected from low-density materials, e.g., plastic (for example but not limited to, polyethylene, blow molding nylon, engineering plastic), rubber, or single material or composite materials capable of achieving the same performance. The rubber may include but not limited to general purpose rubber and specialized rubber. The general purpose rubber may include but not limited to natural rubber, isoprene rubber, styrene-butadiene rubber, butadiene rubber, chloroprene rubber, etc. The specialized rubber may include but not limited to nitrile rubber, silicone rubber, fluorine rubber, polysulfide rubber, urethane rubber, chlorohydrin rubber, acrylic rubber, propylene oxide rubber. The styrene-butadiene rubber may include but not limited to emulsion polymerization and solution polymerization. The composite materials may include but not limited to reinforced materials, e.g., glass fiber, carbon fiber, boron fiber, graphite fiber, fiber, graphene fiber, silicon carbide fiber, or aramid fiber. The composite materials may also be a composite of other organic and/or inorganic materials, such as various types of glass fiber reinforced by unsaturated polyester and epoxy, fiberglass with a phenolic resin matrix. Other materials used as a vibration transfer layer may include silicone, polyurethane (Poly Urethane), polycarbonate (Poly Carbonate), or a combination thereof. The transducer 230 may convert an electrical signal to mechanical vibration based on a specific principle. The panel 220 may be connected to the transducer 230 and may be driven by the transducer 230 to vibrate. The connector 240 may connect the panel 220 and the housing 210, and may fix the transducer 230 in the housing. When the transducer 230 transfers vibrations to the panel 220, the vibrations may be transferred to the housing 210 via the connector 240, which may cause the housing 210 to vibrate and may change the vibration mode of the panel 220, so as to influence vibrations transferred to the skin via the panel 220.

It should be noted that the way to fix the transducer and the panel in the housing may not be limited to the way shown in FIG. 2-B. For person with ordinary skill in the art, whether to use the connector 240, different materials used for making the connector 240, the configuration to fix the transducer 230 or the panel 220 to the housing 210 may have different mechanical impedance characteristics, and result in different vibration transmission effects, thus affecting vibration efficiency of the whole vibration system and producing different sound qualities.

For example, instead of using a connector, the panel may be directly affixed onto the housing using glue or by clamping or welding. If a connector with an appropriate elastic force is used, the connector may absorb shocks and reduce vibrational energy transmitted to the housing, so as to effectively suppress the sound leakage caused by the vibration of the housing, to help avoid abnormal sounds caused by possible abnormal resonance, and to improve the sound quality. The connector located within or on different positions of the housing may produce different effects on the vibration transmission efficiency, and preferably, the connector may enable the transducer to be in different statuses, such as being suspended, supported, and so on.

FIG. 2-B is an embodiment of the connection. The connector 240 may be connected to the top of the housing 210. FIG. 2-C is another embodiment of the connection. The panel 220 may protrude out of an opening of the housing 210. The panel 220 may be connected to the transducer 230 via a connecting portion 250 and connected to the housing 210 via the connector 240.

In some other embodiments, the transducer may be fixed to the housing with other connection means. For example, the transducer may be fixed on the inner bottom of the housing via the connector, or the bottom of the transducer (a side of the transducer connected to the panel is defined as the top, the counterpart is defined as the bottom) may be fixed to the housing by a suspended spring, or the top of transducer may be fixed to the housing, or the transducer may be connected to the housing by multiple connectors with different locations, or a combination thereof.

The housing, the vibration transfer layer, and the panel herein may constitute part of a vibration unit of the bone conduction unit. The transducer may be located in the vibration unit and may transfer vibrations to the vibration unit by connecting the housing and the panel.

FIG. 3 is an embodiment illustrating the sound transmission system. When the bone conduction speaker operates, the vibration unit of the speaker 401 may be in contact with an ear, cheek or forehead and other parts, and transmit sound vibrations to skin 402, the subcutaneous tissue 403, bone 404, and cochlea 405, and the sound may be ultimately transmitted to the brain via the auditory nerve. The sound quality that a person perceives may be affected by the transmission media and other factor(s) affecting the physical property of the transmission media. For example, the density and thickness of the skin and subcutaneous tissue, the shape and density of the bone, and other tissue the vibrations traverse in the transmission process may have an impact on the final sound quality. Further, in the transmission process, the portion of the bone conduction speaker may be in contact with the human body, and the vibration transmission efficiency of human tissue may affect the final sound quality.

For example, the panel of the bone conduction speaker may transmit vibrations to the human hearing system through human tissue, so the changes of the panel material, the contact area, the shape and/or size, and the interaction force between the panel and skin, may affect the sound transmission efficiency, thus affecting the sound quality. For example, under the same drive, the vibrations being transmitted via panels of different sizes may have different distributions on a bonding surface between the panel and a wearer, thus making a difference on the volume and the sound quality. Preferably, the size of the panel may be not less than 0.15 $cm^2$, more preferably not less than 0.5 $cm^2$, further preferably not less than 2 $cm^2$. For example, the panel may vibrate when the transducer vibrates, a bonding point between the panel and the transducer may be at the vibrating center of the panel. Preferably, the mass distribution of the panel around the vibrating center may be homogeneous (the vibrating center may be the physical center of the panel), and more preferably the mass distribution of the panel around the vibrating center may not be homogeneous (the vibrating center may deviate from the physical center of the panel).

In some other embodiments, the outer side of the panel may be covered with a vibration transfer layer. The vibration transfer layer may be in contact with skin, and the vibration component including the panel and the vibration transfer layer may transmit the sound vibration to human tissue. Preferably, the outer side of the panel may be covered with one vibration transfer layer, and more preferably multiple layers; the vibration transfer layer(s) may be made of one or more types of materials, and different vibration transfer layers may be made of different materials or the same material; the multiple vibration transfer layers may be superimposed in a direction perpendicular to the panel, or may be arranged along the direction parallel to the panel, or a combination of both.

The material of the vibration transfer layer may have certain absorbability, flexibility, and certain chemical property, e.g., plastic (for example but not limited to, polyethylene, blow molding nylon, plastic, etc.), rubber, or other single material or composite material. The rubber may include but not limited general purpose rubber and specialized rubber. The general purpose rubber may include but not limited natural rubber, isoprene rubber, styrene-butadiene rubber, butadiene rubber, chloroprene rubber, etc. The specialized rubber may include but not limited to nitrile rubber, silicone rubber, fluorine rubber, polysulfide rubber, urethane rubber, epichlorohydrin rubber, acrylic rubber, propylene oxide rubber. The styrene-butadiene rubber may include not limited to emulsion polymerization and solution polymerization. The composite material may include but not limited to reinforced material, e.g., glass fiber, carbon fiber, boron fiber, graphite fiber, fiber, graphene fiber, silicon carbide fiber, or aramid fiber. The composite material may also be other organic and/or inorganic composite material, such as various types of glass fiber reinforced by unsaturated polyester and epoxy, fiberglass comprising phenolic resin matrix. Other materials used to form the vibration transfer layer may include silicone, polyurethane (Poly Urethane), polycarbonate (Poly Carbonate), or a combination thereof.

The vibration transfer layer may affect the frequency response of the system, change the sound quality of the bone conduction speaker, and protect the components within the housing. For example, the vibration transfer layer may smooth the frequency response of the system by changing the vibrating mode of the panel. The vibrating mode of the panel may be affected by the property of the panel, connection means between the panel and the vibration transfer layer, vibrating frequency, etc. The property of the panel may include the mass, size, shape, stiffness, vibration damping, etc. Preferably, the thickness of the panel may be non-uniform (for example, the thickness at the center may be larger than the thicknesses at edges). The connection means between the panel and the vibration transfer layer may include glue cementation, clamping, welding, etc. The panel may be connected to the vibration transfer layer using glue. Different vibration frequencies may correspond to different vibration modes of the panel, including translation and translation-torsion inordinately. The panel with a specific vibration mode in a specific vibration frequency may change the sound quality of the bone conduction speaker. Preferably, the specific frequency range may be 20 Hz-20000 Hz, more preferably 400 Hz-10000 Hz, further preferably 500 Hz-2000 Hz, and still further preferably 800 Hz-1500 Hz.

Preferably, the above-described vibration transfer layer that covering the outer side of the panel may form one side of the vibration unit. Different regions of the vibration transfer layer may have different vibration transfer properties. For example, the vibration transfer layer may include a first contact surface and a second contact surface. Preferably, the first contact surface may not attach to the panel; the second contact surface may attach to the panel. More preferably, the clamping force on the first contact surface may be less than that on the second contact surface (the clamping force herein may refer to a force between the vibration unit and a user) when the vibration transfer layer is in contact with the user directly or indirectly. Further preferably, the first contact surface may not be in contact with the user directly, and the second contact surface may be in contact with the user to transfer vibrations. The area of the first contact surface may not be equal to that of the second contact surface. Preferably, the area of the first contact surface may be smaller than that of the second contact surface. More preferably, the first contact surface may be configured with a hole to reduce its area. The outer side surface (facing the user) of the vibration transfer layer may be smooth or non-smooth. Preferably, the first contact surface and the second contact surface may not be on a same plane. More preferably, the second contact surface may be above the first contact surface. Further preferably, the first contact surface and the second contact surface may constitute an operation structure. Still, further preferably, the first contact surface may be in contact with the user, the second contact surface may not be in contact with the user. The first contact surface and the second contact surface may be made of different materials or the same material, and may be made of one or more kind of materials of the vibration transfer layer described above. The above descriptions regarding the clamping force are merely an embodiment of the present disclosure, and those skilled in the art may modify the structure and methods described above according to practical requirements, but the modifications are still within the scope of the present disclosure. For example, the vibration transfer layer may not be needed, and the panel may be in contact with the user directly. The panel may be configured to have a plurality of contact surfaces at different areas thereon, and different contact surfaces may have a similar property as the first contact area and the second contact area described above. As another example, the contact surface may include a region of a third contact surface, and the third contact area may be configured to have a structure that is different from those on the first contact area and the second contact area, and the structure may help reduce housing vibration, suppress sound leakage, and improve the frequency response.

FIG. 4-A and FIG. 4-B are a front view and a side view of an exemplary connection between the vibration transfer layer and the panel, respectively. The panel 501 and the vibration transfer layer 503 may be fixed by glue 502. The bond formed by the glue may be located at the two ends of the panel 501, and the panel 501 may be located within a housing formed by the vibration transfer layer 503 and the housing 504. Preferably, the first contact area may be a region that the panel 501 is projected on the vibration transfer layer 503; a second contact area may refer to the area around the first contact area.

FIG. 5 illustrates an exemplary connection means for connecting the components of the vibration generation portion of the bone conduction speaker. The transducer may be connected to the housing 620, the panel 630 may be fixed to the vibration transfer layer 640 by glue 650, and the edges of the vibration transfer layer 640 may be connected to the housing 620. In different embodiments, the frequency response may be modified by changing the distribution, hardness, and amount of the glue 650, or changing the hardness of the vibration transfer layer 640, thereby modifying the sound quality. Preferably, there may be no glue between the panel and the vibration transfer layer. More preferably, there may be glue fully applied between the panel and the vibration transfer. Further preferably, there may be glue partially applied between the panel and the vibration transfer layer. Still, further preferably, the glue area between the panel and the vibration transfer may not be larger than the area of the panel.

FIG. 6 is a structure diagram illustrating a bone conduction speaker in accordance with some embodiments of the present disclosure. As illustrated in the figure, the bone conduction speaker may include a headset bracket/headset lanyard 1201, a vibration unit 1202, and a transducer 1203. The vibration unit 1202 may include a contact surface 1202*a* and a housing 1202*b*. The transducer 1203 is set within the vibration unit 1202 and is connected to it. Preferably, the vibration unit 1202 may further include a panel and a vibration transfer layer described above, and the contact surface 1202*a* may be the surface being in contact with both the vibration unit 1202 and a user. More preferably, the contact surface 1202*a* may be the outer surface of the vibration transfer layer.

During usage, the bone conduction speaker may be fixed to some special parts of a user body, for example, the head, by means of the headset bracket/headset lanyard 1201, which provides a clamping force between the vibration unit 1202 and the user. The contact surface 1202*a* may be connected to the transducer 1203, and keep contact with a user for transferring vibrations to the user. A relatively fixed position when the bone conduction speaker works may be selected as the fixed end. In some embodiments of the present disclosure, the bone conduction speaker has a symmetrical structure, and driving forces provided by transducers at two sides are equal and opposite, and the midpoint of the headset bracket/headset lanyard may be selected as an equivalent fixed end accordingly, for example, the position 1204. In some other embodiments, the driving forces provided by the transducers at two sides are unequal, in other words, the bone conduction speaker generates stereo, or the bone conduction speaker has an asymmetric structure, and other points or areas on/off the headset bracket/headset lanyard may be chosen as the equivalent fixed end. The fixed end described herein may be an equivalent end relatively fixed when the bone conduction speaker works. The fixed end and the vibration unit 1202 may be connected to the headset bracket/headset lanyard 1201, and the transfer relationship K1, which refers to the vibration transfer relationship between the fixed end and the vibration generation portion, may relate to the headset bracket/headset lanyard 1201 and clamping force provided by the headset bracket/headset lanyard 1201, which depends on the physical property of the headset bracket/headset lanyard 1201. Preferably, changing the physical parameter of the headset bracket/headset lanyard 1201, for example, clamping force, weight, or the like, may change the sound transmission efficiency of the bone conduction speaker and may affect the frequency response in the specific frequency range. For example, the headset bracket/headset lanyard with different intensity materials may provide different clamping forces. Changing the structure of the headset bracket/headset lanyard, for example, by adding an assistant device with elastic force may also change the clamping force, therefore affecting the sound transmission efficiency. Different sizes of the headset bracket/headset lanyard may also affect the clamping force, which increases as the distance between two vibration units decreases.

To obtain a headset bracket/headset lanyard with a certain clamping force, a person having ordinary skill in the art may practice variations or modifications based on actual situations, like choosing a material with different stiffness, modulus, or changing the size of the headset bracket/headset lanyard under the teaching of the present disclosure. It should be noted that different clamping force may affect not only the sound transmission efficiency but also the user experience in the lower frequency range. The clamping force described herein refers to force between a contact surface and a user. Preferably, the clamping force is between 0.1 N-5 N. More preferably, the clamping force ranges from 0.1 N to 4 N. More preferably, the clamping force ranges from 0.2 N to 3 N. More preferably, the clamping force ranges from 0.2 N to 1.5 N. And further preferably, the clamping force ranges from 0.3 N to 1.5 N.

The clamping force of the headset bracket/headset lanyard may be determined by the material. Preferably, the material used in the headset bracket/headset lanyard may include plastic with certain hardness, for example, but not limited to, Acrylonitrile butadiene styrene (ABS), Polystyrene (PS), High impact polystyrene (HIPS), Polypropylene (PP), Polyethylene terephthalate (PET), Polyester (PES), Polycarbonate (PC), Polyamides (PA), Polyvinyl chloride (PVC), Polyurethanes (PU), Polyvinylidene chloride Polyethylene (PE), Polymethyl methacrylate (PMMA), Polyetheretherketone (PEEK), Melamine formaldehyde (MF), or the like, or any combination thereof. More preferably, the materials of the headset bracket/headset lanyard may include metal, alloy (for example, aluminum alloy, chromium-molybdenum alloy, a scandium alloy, magnesium alloy, titanium alloy. magnesium-lithium alloy, nickel alloy), or compensate, etc. Further, the material of the headset bracket/headset lanyard may include a memory material. The memory material may include but not limited to memory alloy, memory polymer, inorganic memory material, etc. Memory alloy may include titanium-nickel-copper memory alloy, titanium-nickel-iron memory alloy, titanium-nickel-chromium memory alloy, copper-nickel-based memory alloy, copper-aluminum-based memory alloy, copper-zinc-based memory alloy, iron-based memory alloy, etc. Memory polymer may include but not limited to Polynorbornene, trans-polyisoprene, styrene-butadiene copolymer, cross-linked polyethylene, polyurethanes, lactones, fluorine-containing polymers, polyamides, crosslinked polyolefin, polyester, etc. Memory inorganic material may include but not limited to memory ceramics, memory glass, garnet, mica, etc. Furthermore, the memory material may have selected memory temperature. Preferably, the memory temperature may not be lower than 10° C. More preferably, the memory temperature may not be lower than 40° C. More preferably, the memory temperature may not be lower than 60° C. Moreover, further preferably, the memory temperature may not be lower than 100° C. The percentage of the memory material in the headset bracket/headset lanyard may not be less than 5%. More preferably, the percentage may not be less than 7%. More preferably, the percentage may not be less than 15%. More preferably, the percentage may not be less than 30%. Moreover, further preferably, the percentage may not be less than 50%. The headset bracket/headset lanyard herein refers to a hang-back structure that provides a clamp force for the bone conduction speaker. The memory material may be at different locations of the headset bracket/headset lanyard. Preferably, the memory material may be at the stress concentration location of the headset bracket/headset lanyard, for example but not limited to the joints between the headset bracket/headset lanyard and the vibration unit, the symmetric center of the headset bracket/headset lanyard, or at a location where wires within the headset bracket/headset lanyard are intensively distributed. In some embodiments, the headset bracket/headset lanyard may be made of a memory alloy, which reduces the clamping force difference for different users and improves the consistency of tone quality which is affected by the clamping force. In some embodiments, the headset bracket/headset lanyard made of a memory alloy may be elastic enough, thus being able to recover to its original shape after a large deformation, and in addition, may stably maintain the clamping force after long time deformation. In some embodiments, the headset bracket/headset lanyard made of a memory alloy may be light enough and flexible enough to provide great deformation and distortion and be better connected to a user.

The clamping force provides force between the surface of the vibration generation portion of the bone conduction speaker and a user. FIG. 7-A and FIG. 7-B are embodiments for illustrating vibration response curves with different forces between the contact surface and a user. The clamping force lower than a certain threshold may be not suitable for the transmission of the high-frequency vibration. As is illustrated in FIG. 7-A, for the same vibration source (sound source), the intermediate frequency and the high-frequency vibration (sound) received by the user when the clamping force is 0.1 N are less than those of 0.2 N and 1.5 N. That is, the effect of the intermediate frequency and the high-frequency parts at 0.1 N are weaker than that of a clamping force ranging from 0.2 N to 1.5 N. Likewise, the clamping force higher than a certain threshold may be not suitable for the transmission of the low-frequency vibration either. As is illustrated in FIG. 7-B, for the same vibration source (sound source), the intermediate frequency and the low-frequency vibration (sound) received by the user when the clamping force is 5.0 N are less than those of 0.2 N and 1.5 N. That is, the effect of the low-frequency part at 5.0 N is weaker than that of a clamping force ranging from 0.2 N to 1.5 N.

In some embodiments, the force between the contact surface and the user may keep in a certain range on the basis of both a suitable choice of the headset bracket/headset lanyard material and a proper headset bracket/headset lanyard structure. The force between the contact surface and the user may be larger than a threshold. Preferably, the threshold is 0.1 N. More preferably, the threshold is 0.2 N. More preferably, the threshold is 0.3 N. Moreover, further preferably, the threshold is 0.5 N. For those with ordinary skill in the art, a certain amount of modifications and changes may be deducted for the materials or structure of the headset bracket/headset lanyard in light of the principle that the clamping force provided by the bone conduction speaker changes the frequency response of the bone conduction system, and a range of the clapping force satisfying different tone quality requirements may be set. However, those modifications and changes do not depart from the scope of the present disclosure.

The clamping force of the bone conduction speaker may be tested with certain devices or methods. FIG. 8-A and FIG. 8-B illustrate an exemplary embodiment of testing the clamping force of the bone conduction speaker. Point A and point B may be close to the vibration unit of the headset bracket/headset lanyard of the bone conduction speaker. In the testing process, one of the point A or the point B may be fixed, and the other one of the point A or the point B may be connect to a force-meter. When a distance between the point A and the point B is in a range of 125 mm~155 mm, the clamping force may be obtained. FIG. 8-C illustrates three frequency vibration response curves corresponding to different clapping forces of the bone conduction speaker. Clapping forces corresponding to the three curves may be 0 N, 0.61 N, and 1.05 N, respectively. FIG. 8-C shows that the load on the vibration unit of the bone conduction speaker, which may be generated by a user's face, may be larger with an increasing clamping force of the bone conduction speaker, and vibrations from a vibration area may be reduced. A bone conduction speaker with too small clapping force or too large clapping force may lead to an unevenness (e.g., a range from 500 Hz to 800 Hz on curves corresponding to 0 N and 1.05 N, respectively) on the frequency response during vibration. If the clamping force is too large (e.g., the curve corresponding to 1.05 N), a user may feel uncomfortable, and vibrations of the bone conduction speaker may be reduced, and sound volume may be lower; if the clamping force is too small (e.g., the curve corresponding to 0 N), a user may feel more apparent vibrations from the bone conduction speaker.

Figure 9:
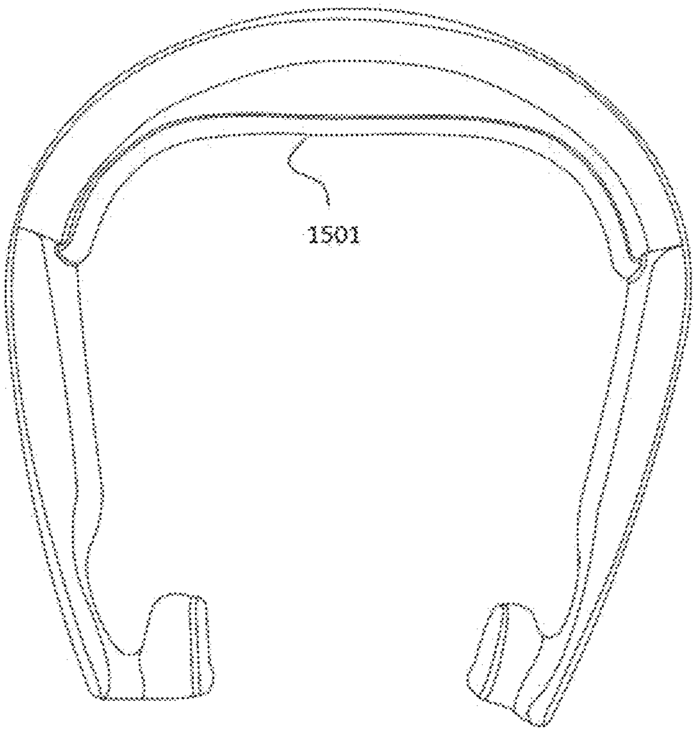
FIG. 9 illustrates a configuration to adjust the clamping force of the bone conduction speaker according to some embodiments of the present disclosure.

It should be noted that the above descriptions about changing the clamping force of the bone conduction speaker are merely provided for illustration purposes, and should not be the only one feasible embodiments. It should be apparent that for those having ordinary skill in the art, multiple variations may be made on changing the clamping force of the bone conduction speaker in light of the principle of the bone conduction speak. However, those variations do not depart from the scope of the present disclosure. For example, a memory material may be used in the headset bracket of the bone conduction speaker, which may enable the bone conduction speaker has a radian to accommodate different users' heads, having a good elasticity, enhancing comfort when wearing the bone conduction speaker, and facilitating the clapping force adjustment. Further, an elastic bandage 1501 used to adjust the clamping force may be installed on the headset bracket of the bone conduction speaker, as illustrated in FIG. 9, the elastic bandage may provide an additional recovery force when the headset bracket/headset lanyard is compressed or stretched off a balanced position.

The frequency response curve of the bone conduction system may be a superposition of frequency response curves of multiple points on the contact surface. Factors that change the impedance may include the size of the energy transmission area, the shape of the energy transmission area, the roughness of the energy transmission area, the force on the energy transmission area, or a distribution of the force on the energy transmission area, etc. For example, the transmission effect of sound may change when changing the structure and shape of the vibration unit 1202, thus changing the sound quality of the bone conduction speaker. Merely by way of example, the transmission effect of sound may be changed by changing the corresponding physical characteristic of the contact surface 1202*a* of the vibration unit 1202.

A well-designed contact surface may have a gradient structure, and the gradient structure may refer to an area with various heights on the contact surface. The gradient structure may be a convex/concave portion or a sidestep that exists on an outer side (towards a user) or inner side (backward a user) of the contact surface. An embodiment of a vibration unit of the bone conduction speaker may be illustrated in FIG. 10-A. A convex/concave portions (not shown in FIG. 10-A) may exist on a contact surface 1601 (an outer side of the contact surface). During the operation of the bone conduction speaker, the convex/concave portion may be in contact with a user's face, changing the forces between different positions on the contact surface 1601 and a user's face. A convex portion may be in contact with a user's face in a tighter manner; thus the force on the skin and tissue of a user that contact with the convex portion may be larger, and the force on the skin and tissue that contact with a concave portion may be smaller accordingly. For example, three points A, B, and C on the contact surface 1601 in FIG. 10-A may be located on a non-convex portion, an edge of a convex portion, and a convex portion, respectively. When being in contact with a user's skin, clapping forces $F_A$, $F_B$, and $F_C$ on the three points may be $F_C>F_A>F_B$. In some embodiments, the clamping force on the point B may be 0; i.e., the point B may not be in contact with the skin of a user. The skin and tissue of a user's face may have different impedances and responses under different forces. The part of a user's face under a larger force may correspond to a smaller impedance rate and have a high-pass filtering characteristic for an acoustic wave. The part under a smaller force may correspond to a larger impedance rate, and have a low-pass filtering characteristic for an acoustic wave. Different parts of the contact surface 1601 may correspond to different impedance characteristics L. According to equation (1), different parts may correspond to different frequency responses for sound transmission. The transmission effect of the sound via the entire contact surface may be equivalent to a sum of transmission effect of the sound via each part of the contact surface. A smooth curve may be formed when the sound transmits into a user's brain, which may avoid exorbitant harmonic peak under a low frequency or a high frequency, thus obtaining an ideal frequency response across the whole bandwidth. Similarly, the material and thickness of the contact surface 1601 may have an effect on the transmission effect of the sound, thus affecting the sound quality. For example, when the contact surface is soft, the transmission effect of the sound in the low frequency range may be better than that in the high frequency range, and when the contact surface is hard, the transmission effect of the sound in the high frequency range may be better than that in the low frequency range.

FIG. 10-B shows response curves of the bone conduction speaker with different contact areas. The dotted line corresponds to the frequency response of the bone conduction speaker having a convex portion on the contact surface. The solid line corresponds to the frequency response of the bone conduction speaker having a non-convex portion of the contact surface. In a low-intermediate frequency range, the vibration of the non-convex portion may be weakened relative to that of the convex portion, which may form one "pit" on the frequency response curve, indicating that the frequency response is not ideal and may influence the sound quality.

The above descriptions of the FIG. 10-B are merely the explanation for a specific embodiment, and those skilled in the art, after understanding the basic principles of bone conduction speaker, may make various modifications and changes on the structure and the components to achieve different frequency response effects.

It should be noted that for those skilled in the art, the shape and the structure of the contact surface may not be limited to the descriptions above. In some embodiments, the convex portion or the concave portion may be located at an edge of the contact surface or may be located at the center of the contact surface. The contact surface may include one or more convex portions or concave portions. The convex portion and/or concave portion may be located on the contact surface. The material of the convex portion or the concave portion may be different from the material of the contact surface, such as flexible material, rigid material, or a material easy to produce a specific force gradient. The material may be memory material or non-memory material; the material may be a single material or composite material. The structure pattern of the convex portion or concave portion of the contact surface may include but not limited to axial symmetrical pattern, central symmetrical pattern, symmetrical rotational pattern, asymmetrical pattern, etc. The structure pattern of the convex portion or the concave portion on the contact surface may include one pattern, two patterns, or a combination of two or patterns. The contact surface may include but not limited to a certain degree of smoothness, roughness, waviness, or the like. The distribution of the convex portions or the concave portions on the contact surface may include but not limited to axial symmetry, the center of symmetry, rotational symmetry, asymmetry, etc. The convex portion or the concave portion may be set at an edge of the contact surface or may be distributed inside the contact surface.

Figure 11:
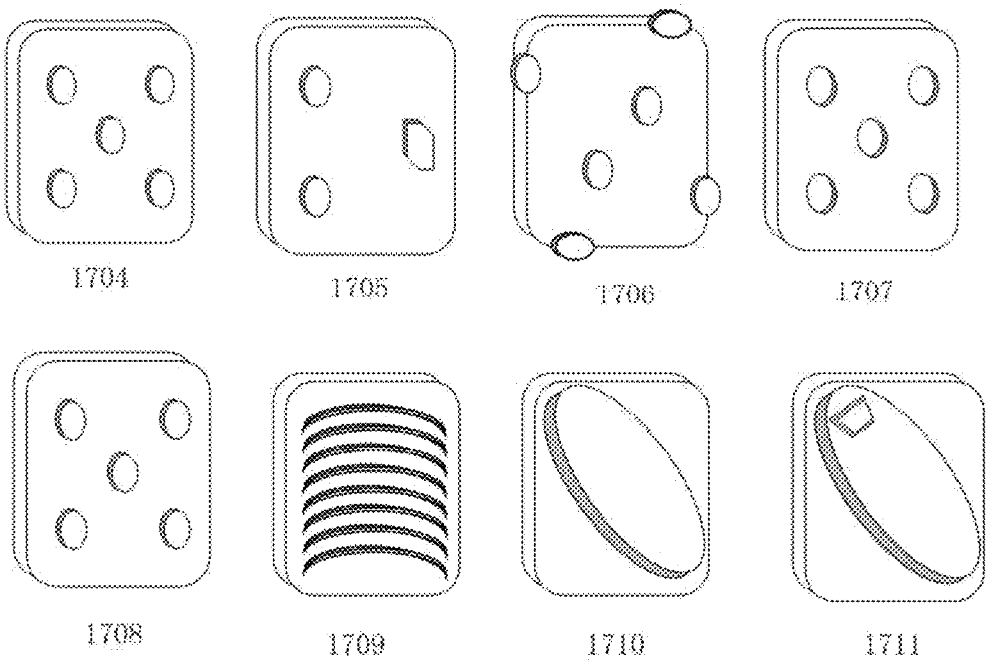
FIG. 11 illustrates a structure of the contact surface of the vibration unit of the bone conduction speaker according to some embodiments of the present disclosure.

1704-0709 in FIG. 11 are embodiments of the structure of the contact surface.

1704 in FIG. 17 shows multiple convex portions with similar shapes and structures on the contact surface. The convex portions may be made of a same material or similar materials as other parts of the panel, or different materials. In particular, the convex portions may be made of a memory material and the material of the vibration transfer layer, wherein the proportion of the memory material may be not less than 10%. Preferably, the proportion may be not less than 50%. The area of a single convex portion may be 1%-80% of the total area, preferably 5%-70%, and more preferably 8%-40%. The sum of the area of the convex portions may be 5%-80% of the total area, preferably 10%-60%. There may be at least one convex portion, preferably one convex portion, more preferably two convex portions, and further preferably at least five convex portions. The shapes of the convex portions may be circular, oval, triangular, rectangular, trapezoidal, irregular polygons or other similar patterns, wherein the structures of the convex portions may be symmetrical, or asymmetrical, the distribution of the convex portions may be symmetrically distributed or asymmetrically distributed, the number of the convex portions may be one or more, the heights of the convex portions may be the same or different, and the height distribution of the convex portions may form a certain gradient.

1705 in FIG. 11 shows an embodiment of convex portions on the contact surface with two or more structure patterns. There may be one or more convex portions of different patterns. Shapes of the two or more convex portions may be circular, oval, triangular, rectangular, trapezoidal, irregular polygons, other shapes, or a combination of any two or more shapes. The material, quantity, size, symmetry of the convex portions may be similar to that as illustrated in 1704.

1706 in FIG. 11 shows an embodiment that the convex portions may be distributed at edges of the contact surface or in the contact surface. The number of the convex portions located at edges of the contact surface may be 1% to 80% of the total number of the convex portions, preferably 5%-70%, more preferably 10%-50%, and more preferably 30%-40%. The material, quantity, size, shape, or symmetry of the convex portions may be similar to 1704.

1707 in FIG. 11 shows a structure pattern of concave portions on the contact surface. The structures of the concave portions may be symmetrical or asymmetrical, the distribution of the concave portions may be symmetrical or asymmetrical, the number of the concave portions may be one or more than one, the shapes of the concave portions may be same or different, and the concave portions may be hollow. The area of a single concave portion may be not less than 1%-80% of the total area of the contact surface, preferably 5%-70%, and more preferably 8%-40%. The sum of the area of all concave portions may be 5%-80% of the total area, preferably 10%-60%. There may be at least one concave, preferably one, more preferably two, and more preferably at least five. The shapes of the concave portions may be circular, oval, triangular, rectangular, trapezoidal, irregular polygons or other similar patterns.

1708 in FIG. 11 shows a contact surface including convex portions and concave portions. There may be one or more convex portions and one or more concave portions. The ratio of the number of the concave portions to the convex portions may be 0.1%-100%, preferably 1%-80%, more preferably 5%-60%, further preferably 10%-20%. The material, quantity, size, shape, or symmetry of each convex portion or each concave portion may be similar to 1704.

1709 in FIG. 11 shows an embodiment of the contact surface having a certain waviness. The waviness may be formed by two or more convex/concave portions. Preferably, the distances between adjacent convex/concave portions may be equal. More preferably, the distances between convex/concave portions may be presented in an arithmetic progression.

1710 in FIG. 11 shows an embodiment of a convex portion having a large area on the contact surface. The area of the convex portion may be 30%-80% of the total area of the contact surface. Preferably, a part of an edge of the convex portion may substantially contact with a part of an edge of the contact surface.

1711 in FIG. 11 shows a first convex portion having a large area on the contact surface, and a second convex portion on the first convex portion may have a smaller area. The area of the convex portion having a larger area of the may be 30%-80% of the total area, and the area of the convex portion having a smaller area may be 1%-30% of the total area, preferably 5%-20%. The area of the smaller area may be 5%-80% that of the larger area, preferably 10%-30%.

The above descriptions of the contact surface structure of the bone conduction speaker are merely a specific embodiment, and it may not be considered the only feasible implementation. Apparently, those skilled in the art, after understanding the basic principles of bone conduction speaker, may make various modifications and changes in the type and detail of the contact surface of the bone conduction speaker, but these changes and modifications are still within the scope described above. For example, the number of the convex portions and the concave portions may not be limited to that of the FIG. 11, and modifications made on the convex portions, the concave portions, or the patterns of the contact surface may remain in the descriptions above. Moreover, the contact surface of at least one vibration unit of the bone conduction speaker may have the same or different shapes and materials. The effect of vibrations transferred via different contact surfaces may have differences due to the properties of the contact surfaces, which may result in different sound effects.

EXAMPLES

Example 1

A bone conduction speaker may include a U-shaped headset bracket/headset lanyard, two vibration units, a transducer connected to each vibration unit. The vibration unit may include a contact surface and a housing. The contact surface may be an outer surface of a silicone rubber transfer layer and may be configured to have a gradient structure including a convex portion. The clamping force between the contact surface and skin due to the headset bracket/headset lanyard may be unevenly distributed on the contact surface. The sound transfer efficiency of the portion of the gradient structure may be different from the portion without the gradient structure.

Example 2

This example may be different from Example 1 in the following aspects. The headset bracket/headset lanyard as described may include a memory alloy. The headset bracket/headset lanyard may match the curves of different users' heads and have a good elasticity and a better wearing comfort. The headset bracket/headset lanyard may recover to its original shape from a deformed status last for a certain period. As used herein, the certain period may refer to ten minutes, thirty minutes, one hour, two hours, five hours, or may also refer to one day, two days, ten days, one month, one year, or a longer period. The clamping force that the headset bracket/headset lanyard provides may keep stable, and may not decline gradually over time. The force intensity between the bone conduction speaker and the body surface of a user may be within an appropriate range, so as to avoid pain or clear vibration sense caused by undue force when the user wears the bone conduction speaker. Moreover, the clamping force of bone conduction speaker may be within a range of 0.2 N~1.5 N when the bone conduction speaker is used.

Example 3

The difference between this example and the two examples mentioned above may include the following aspects. The elastic coefficient of the headset bracket/headset lanyard may be kept in a specific range, which results in the value of the frequency response curve in low frequency (e.g., under 500 Hz) being higher than the value of the frequency response curve in high frequency (e.g., above 4000 Hz).

Example 4

The difference between Example 4 and Example 1 may include the following aspects. The bone conduction speaker may be mounted on an eyeglass frame, or in a helmet or mask with a special function.

The embodiments described above are merely implements of the present disclosure, and the descriptions may be specific and detailed, but these descriptions may not limit the present disclosure. It should be noted that those skilled in the art, without deviating from concepts of the bone conduction speaker, may make various modifications and changes to, for example, the sound transfer approaches described in the specification, but these combinations and modifications are still within the scope of the present disclosure.

We claim:

1. A bone conduction speaker, comprising:

a vibration unit and a headset bracket, wherein:

the vibration unit includes a surface contacting with and transferring vibrations to a user, the headset bracket providing a force between the contact surface and the user, the force between the contact surface and the user being larger than 0.3 N and smaller than 1.5 N.

2. The bone conduction speaker of claim 1, wherein the headset bracket includes a structure made of metal or alloy.

3. The bone conduction speaker of claim 1, wherein materials used in the headset bracket includes a memory material.

4. The bone conduction speaker of claim 3, wherein a percentage of the memory material in the memory material is not less than 30%.

5. The bone conduction speaker of claim 1, wherein the headset bracket is a hang-back structure that provides the force between the contact surface and the user.

6. The bone conduction speaker of claim 1, wherein the surface of the vibration unit includes a gradient structure.

7. The bone conduction speaker of claim 6, wherein the gradient structure includes a convex portion located at a center or an edge of the contact surface.

8. The bone conduction speaker of claim 6, wherein the gradient structure includes a convex portion, and an area of the convex portion is not less than 5% of a total area of the contact surface.

9. The bone conduction speaker of claim 6, wherein the gradient structure includes a concave portion on the contact surface.

10. The bone conduction speaker of claim 1, wherein the contract surface is provided by a vibration transfer layer of the vibration unit, and the vibration transfer layer is made of silicone rubber.

11. The bone conduction speaker of claim 10, wherein the vibration unit further includes a panel inside the vibration transfer layer, the panel and the vibration transfer layer being joined by glue.

12. The bone conduction speaker of claim 11, wherein an area of the panel is not less than 0.5 $cm^2$.

13. The bone conduction speaker of claim 11, further including a transducer located within the vibration unit, wherein the transducer is configured to transfer vibrations to the panel through a bonding point between the panel and the transducer.

14. The bone conduction speaker of claim 11, wherein the vibration unit includes a housing, and the panel is connected to the housing via a connector.

15. The bone conduction speaker of claim 11, wherein the vibration unit includes a housing, and the panel is affixed to the housing using glue or by clamping.

16. The bone conduction speaker of claim 11, wherein a thickness of the panel is non-uniform.

17. The bone conduction speaker of claim 11, wherein the vibration transfer layer includes a first contact surface that does not attach to the panel and a second contact surface that attaches to the panel.

18. The bone conduction speaker of claim 17, wherein the second contact surface protrudes above the first contact surface.

19. The bone conduction speaker of claim 1, further including an elastic bandage installed on the headset bracket.

20. The bone conduction speaker of claim 1, wherein the force between the contact surface and the user is unevenly distributed on the contact surface.

* * * * *